United States Patent
Gagliano

(10) Patent No.: US 8,190,348 B2
(45) Date of Patent: May 29, 2012

(54) SYSTEM AND METHOD FOR DAMPING VIBRATIONS IN A MOTOR VEHICLE

(75) Inventor: Charles J. Gagliano, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 420 days.

(21) Appl. No.: 12/476,686

(22) Filed: Jun. 2, 2009

(65) Prior Publication Data

US 2010/0305837 A1    Dec. 2, 2010

(51) Int. Cl.
   *G06F 19/00*   (2011.01)
(52) U.S. Cl. .......................... 701/111; 701/114
(58) Field of Classification Search .............. 701/99, 701/110, 114, 111; 180/411, 421, 422, 417, 180/477
   See application file for complete search history.

(56) References Cited

U.S. PATENT DOCUMENTS

| | | | |
|---|---|---|---|
| 4,650,170 A | 3/1987 | Fukushima | |
| 4,917,139 A * | 4/1990 | Narumi et al. | 137/110 |
| 5,076,383 A * | 12/1991 | Inoue et al. | 180/417 |
| 5,116,029 A | 5/1992 | Gennesseaux | |
| 5,505,119 A * | 4/1996 | Phillips | 91/375 R |
| 5,761,627 A * | 6/1998 | Seidel et al. | 701/41 |
| 5,810,336 A | 9/1998 | Gennesseaux | |
| 5,906,254 A | 5/1999 | Schmidt et al. | |
| 6,167,334 A * | 12/2000 | Liubakka et al. | 701/42 |
| 6,173,223 B1 * | 1/2001 | Liubakka et al. | 701/42 |
| 6,298,941 B1 * | 10/2001 | Spadafora | 180/422 |
| 6,370,459 B1 * | 4/2002 | Phillips | 701/41 |
| 6,491,313 B1 | 12/2002 | Rui et al. | |
| 6,561,305 B2 | 5/2003 | Smith, Jr. et al. | |
| 6,681,883 B2 * | 1/2004 | Loh et al. | 180/417 |
| 6,938,721 B2 * | 9/2005 | Ono et al. | 180/402 |
| 7,100,735 B2 * | 9/2006 | Burton et al. | 180/446 |
| 7,487,856 B2 * | 2/2009 | Edson et al. | 180/421 |
| 7,590,502 B2 * | 9/2009 | Obata | 702/113 |
| 2006/0201734 A1 * | 9/2006 | Hartle | 180/417 |
| 2007/0251754 A1 * | 11/2007 | Webert et al. | 180/417 |
| 2007/0256885 A1 * | 11/2007 | Ammon et al. | 180/417 |
| 2007/0299580 A1 * | 12/2007 | Lin et al. | 701/41 |
| 2008/0243340 A1 * | 10/2008 | Hung et al. | 701/42 |

OTHER PUBLICATIONS

Lee et al. "Active Tuned Absorrber for Displacement-On-Demand Vehicles", 2005 SAE International.
U.S. Appl. No. 12/123,912, filed May 20, 2008.

* cited by examiner

*Primary Examiner* — John T. Kwon
*Assistant Examiner* — Johnny Hoang
(74) *Attorney, Agent, or Firm* — Plumsea Law Group, LLC

(57) ABSTRACT

An engine damping system is disclosed. The engine damping system includes an actuating device that is hydraulically powered using a power steering system of a motor vehicle. The system also includes a steering position sensor to determine a steering mode of the motor vehicle. The system also includes an acceleration sensor to provide controlled feedback for the actuating device.

21 Claims, 6 Drawing Sheets

SYSTEM AND METHOD FOR DAMPING VIBRATIONS IN A MOTOR VEHICLE

BACKGROUND OF THE INVENTION

1. Field of the Invention

The present invention relates to motor vehicles and in particular to a damping system for an engine of a motor vehicle.

2. Description of Related Art

In motor vehicles using variable cylinder management to deactivate one or more cylinders for increased driving efficiency, increased vibrations can occur. In previous designs, active control mounts have been applied to a sub-frame of the engine in order to counteract the increased engine vibrations. However, active control mounts are limited in output force. There is a need in the art for a system that can help reduce or cancel vibrations from the engine.

SUMMARY OF THE INVENTION

A system and method for damping vibrations from an engine of a motor vehicle is disclosed. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to: cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides an engine damping system for a motor vehicle, comprising: an actuating device disposed adjacent to an engine mount and configured to dampen vibrations produced by the engine; a power steering system; at least one fluid line connecting the actuating device to the power steering system; a valve associated with the at least one fluid line configured to control the fluid communication between the power steering system and the actuating device; a control unit in communication with the valve; and where the control unit is configured to determine an engine operating mode of an engine and wherein the control unit controls the valve according to the engine operating mode.

In another aspect, the invention provides a method of operating a motor vehicle, comprising the steps of: receiving acceleration information from an acceleration sensor, the acceleration sensor being configured to monitor vibrations from an engine; determining a damping characteristic according to the acceleration information; and controlling fluid communication between a power steering system and an actuating device according to the damping characteristic.

In another aspect, the invention provides a method of operating a motor vehicle, comprising the steps of: determining an engine mode of an engine; permitting fluid communication between an actuating device and a power steering system when the engine mode is a deactivated cylinder mode; and preventing fluid communication between the actuating device and the power steering system when the engine mode is a full cylinder mode.

Other systems, methods, features and advantages of the invention will be, or will become, apparent to one of ordinary skill in the art upon examination of the following figures and detailed description. It is intended that all such additional systems, methods, features and advantages included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE EXEMPLARY EMBODIMENTS

Figure 1:
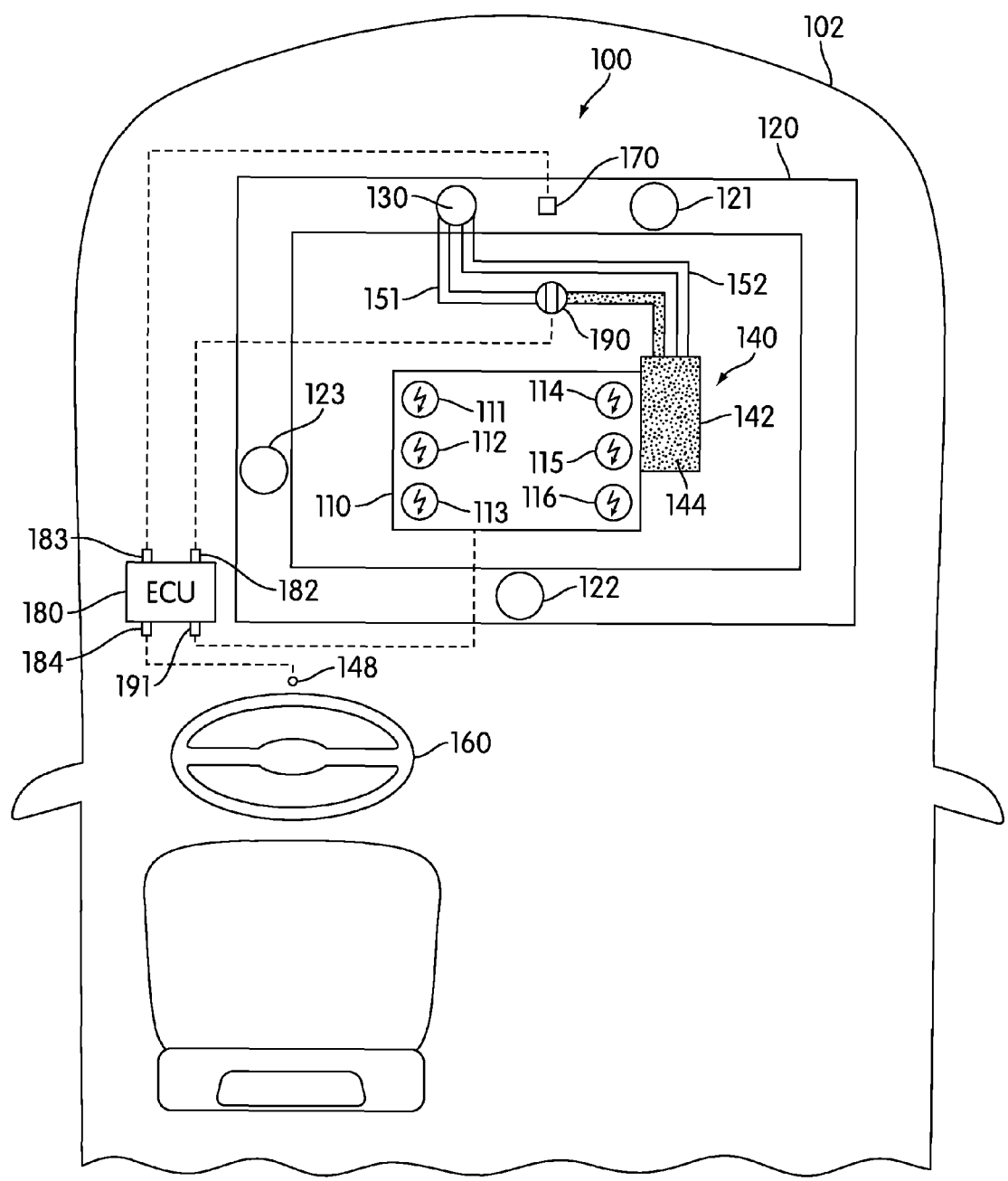
FIG. 1 is a schematic view of an exemplary embodiment of a portion of a motor vehicle including an engine damping system.

FIG. 1 is a schematic view of an exemplary embodiment of a portion of engine damping system 100. In some cases, engine damping system 100 can be associated with motor vehicle 102. The current embodiment of a motor vehicle is schematic and it should be understood that in different embodiments engine damping system 100 may be associated with any type of motor vehicle, including, but not limited to: cars, trucks, vans, minivans, SUV's, motorcycles, scooters, boats, personal watercraft, and aircraft.

In some embodiments, engine damping system 100 can be associated with engine 110. Generally, engine 110 can be any type of engine. In different embodiments, engine 110 can include any number of cylinders including, but not limited to: one cylinder, two cylinders, three cylinders, four cylinders, five cylinders, six cylinders, seven cylinders, eight cylinders or more than eight cylinders. In this exemplary embodiment, engine 110 may be a six cylinder engine. In particular, engine 110 includes first cylinder 111, second cylinder 112, third cylinder 113, fourth cylinder 114, fifth cylinder 115 and sixth cylinder 116.

Engine 110 may be associated with sub-frame 120. In some cases, engine 110 may be attached directly to sub-frame 120.

In different embodiments, engine 110 can be attached to sub-frame 120 using one or more engine mounts. In some cases, active control mounts can be used. In other cases, other types of mounts can be used. In the current embodiment, engine 110 may be attached to sub-frame 120 using front engine mount 121, rear engine mount 122 and side engine mount 123. With this arrangement, sub-frame 120 provides a support frame for engine 110.

In some embodiments, an engine can be configured for cylinder deactivation. The term "cylinder deactivation" as used throughout this detailed description and in the claims refers to a state of an engine in which one or more cylinders are not used. In particular, an engine may undergo cylinder deactivation whenever a fuel cut occurs in one or more cylinders of the engine. For example, some six cylinder engines can be operated in a three cylinder mode by deactivating one side, or bank, of a V-6 engine.

Figure 2:
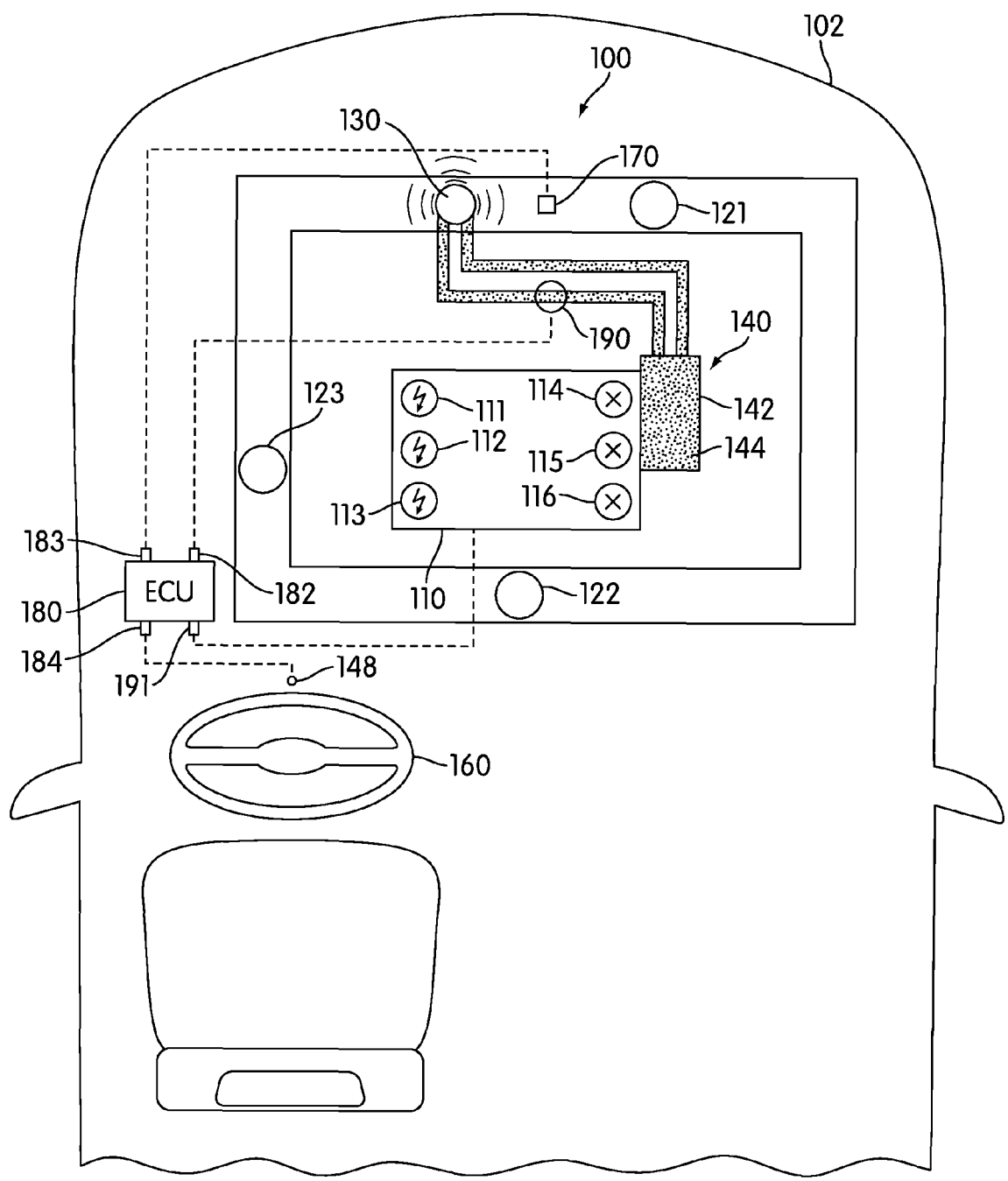
FIG. 2 is a schematic view of an exemplary embodiment of a portion of a motor vehicle including an engine damping system in an activated mode.

Referring to the current embodiment, engine 110 may be configured with a variable cylinder management system that is configured to deactivate one or more cylinders according to various engine conditions. Referring to FIG. 2, engine 110 may be configured to operate in a three cylinder mode in some situations, which is also referred to as the L3 mode. In the three cylinder mode, first cylinder 111, second cylinder 112 and third cylinder 113 may remain activated while fourth cylinder 114, fifth cylinder 115 and sixth cylinder 116 are deactivated by stopping fuel supply to the deactivated cylinders. This arrangement can facilitate increased fuel consumption during engine operating conditions that do not require all six cylinders to operate.

Although not illustrated in this embodiment, engine 110 can be configured to operate in other cylinder modes in addition to the three cylinder mode illustrated in FIG. 2. For example, in another embodiment, second cylinder 112 and fifth cylinder 115 could be deactivated in order to operate engine 110 in a four cylinder mode, which is also referred to as the V4 mode. Further examples of deactivated cylinder modes are disclosed in U.S. Pat. No. 7,836,866, (currently U.S. patent application Ser. No. 12/123,912) to Luken, and filed on May 20, 2008, the entirety of which is hereby incorporated by reference.

Sometimes, problems may occur during cylinder deactivation. Under certain operating conditions, when an engine is in a deactivated cylinder mode, the engine mounts and exhaust system must operate under increased vibrations and exhaust flow pulsations. Additionally, drive train components can also introduce additional vibrations. In some cases, unacceptable levels of noise vibration and harshness (NVH) may occur and negatively impact the comfort of the driver and/or passengers within a motor vehicle.

In some embodiments, a motor vehicle can include provisions for reducing or eliminating occurrences of unacceptable NVH within a motor vehicle that can occur during cylinder deactivation. In some embodiments, cylinder deactivation may be prohibited under certain operating conditions of the motor vehicle, even when the current engine load does not require the use of all the cylinders. In other embodiments, a motor vehicle can include provisions for reducing or canceling the vibrations generated at the engine during cylinder deactivation. In an exemplary embodiment, a damping system can be used to reduce or cancel vibrations generated by an engine during cylinder deactivation.

As previously discussed, motor vehicle 102 may include engine damping system 100. In some cases, engine damping system 100 may include one or more components that are configured to apply damping between engine 110 and sub-frame 120 in order to reduce or substantially eliminate NVH.

In one embodiment, engine damping system 100 can be configured to produce vibrations that counteract the vibrating forces applied by engine 110.

Engine damping system 100 can include actuating device 130. In different embodiments, actuating device 130 can be any type of actuator that is configured to generate vibrating forces in order to actively control damping. Examples of different types of actuators that can be used include, but are not limited to: pneumatic actuators, electric actuators, motors, hydraulic cylinders, linear actuators, as well as other types of actuators. In an exemplary embodiment, actuating device 130 may be a hydraulic actuator. With this arrangement, actuating device 130 can generate greater forces over electrically operated actuators.

In different embodiments, actuating device 130 can be powered using any type of hydraulic system. In some cases, actuating device 130 can be powered using a self-contained hydraulic system. In other cases, actuating device 130 can be powered using a hydraulic system already incorporated into motor vehicle 102. In an exemplary embodiment, actuating device 130 can be powered using a power steering system that uses hydraulic pressure in the form of a power steering fluid. With this arrangement, actuating device 130 can be powered using a hydraulic system that is already included in most motor vehicles, which can help reduce costs and increase manufacturing efficiency.

Motor vehicle 102 can include power steering system 140. In some cases, power steering system 140 may be configured to help enhance drivability of a motor vehicle by allowing a driver to turn a steering wheel with reduced torque at steering wheel 160. Power steering system 140 can include various components. In some cases, power steering system 140 can include power steering pump 142 that is configured to control the flow of power steering fluid 144. For purposes of illustration, only some components of power steering system 140 are shown in the current embodiment. For example, power steering system 140 can also include one or more fluid reservoirs for storing power steering fluid 144 outside of power steering pump 142. Additionally, power steering system 140 can include one or more fluid lines for connecting power steering pump 142 with the steering system of motor vehicle 102.

For purposes of illustration, power steering pump 142 is illustrated as disposed adjacent to engine 110 in the current embodiment. However, it should be understood that in other embodiments, power steering pump 142 can be located in any other region of a motor vehicle. In some other embodiments, for example, power steering pump 142 may be disposed closer to a steering system and steering wheel 160.

Power steering system 140 can include one or more sensors configured to determine a steering position of a steering system. In one embodiment, power steering system 140 can include steering position sensor 148. In some cases, steering position sensor 148 can be a steering angle sensor that is configured to determine the angle of a steering wheel. For purposes of clarity, steering position sensor 148 is illustrated schematically in the current embodiment. The information received from steering position sensor 148 can be used to determine a steering mode of motor vehicle. In particular, the information received from steering position sensor 148 can be used to determine if the motor vehicle is in a turning steering mode or a straight line steering mode.

In embodiments including a hydraulic actuating device, power steering system 140 can be used to hydraulically power the actuating device. In the exemplary embodiment, power steering system 140 may be configured to power actuating device 130. In particular, actuating device 130 may be configured to receive hydraulic pressure generated by power steering system 140.

In some cases, actuating device 130 may be in fluid communication with power steering system 140. In some embodiments, one or more fluid lines may be used to provide fluid communication between actuating device 130 and power steering system 140. In this embodiment, first fluid line 151 and second fluid line 152 may be used to provide fluid communication between actuating device 130 and power steering system 140.

In some cases, power steering fluid may be configured to flow from power steering pump 142 to actuating device 130 through first fluid line 151. Likewise, in some cases, power steering fluid may be configured to flow from actuating device 130 to power steering pump 142 through second fluid line 152. In other words, first fluid line 151 serves as an intake line for fluid entering actuating device 130, while second fluid line 152 serves as an outtake line for fluid leaving actuating device 130.

In some embodiments, engine damping system 100 can include provisions to control the fluid communication between actuating device 130 and power steering system 140. In some cases, one or more valves can be used to allow and/or prevent fluid communication between actuating device 130 and power steering system 140. Examples of different valves that may be used include, but are not limited to: gate valves, poppet valves, plug valves, globe valves, check valves, butterfly valves, diaphragm valves, ball valves, needle valves, manual valves, solenoid valves, hydraulic and/or pneumatic valves, as well as other types of valves.

In this exemplary embodiment, engine damping system 100 includes valve 190. In an exemplary embodiment, valve 190 is a servo valve of some kind. In other words, valve 190 can be configured to control the amount, pressure and direction of flow in a substantially continuous manner according to control signals received from a control unit of some kind. A detailed discussion of the control of valve 190 is given below. For purposes of clarity, however, valve 190 is shown schematically in the current embodiment. Furthermore, in some cases, valve 190 may be applied to first fluid line 151. However, in other cases, valve 190 could be applied to second fluid line 152. In still other embodiments, both first fluid line 151 and second fluid line 152 may each include a valve.

In some embodiments, engine damping system 100 can include provisions for sensing vibrations generated by an engine. In one embodiment, engine damping system 100 can include acceleration sensor 170. In an exemplary embodiment, acceleration sensor 170 may be an accelerometer. Examples of different accelerometers include, but are not limited to: piezo-film or piezoelectric sensor type accelerometers, shear mode accelerometers, surface micromachined capacitive accelerometers, thermal accelerometers, bulk micromachined capacitive accelerometers, bulk micromachined piezo resistive accelerometers, capacitive spring mass based accelerometers, electromechanical servo accelerometers, null-balance accelerometers, strain gauge accelerometers, resonance accelerometers, magnetic induction accelerometers, optical accelerometers, surface acoustic wave accelerometers, laser accelerometers, high temperature accelerometers, low frequency accelerometers, high gravity accelerometers, triaxial accelerometers, modally tuned impact hammer accelerometers, seat pad accelerometers, pendulating integrating gyroscopic accelerometers, as well as other types of accelerometers. In still other embodiments, acceleration sensor 170 may be another type of acceleration sensor.

Motor vehicle 102 can include provisions for monitoring and/or controlling various systems and/or components. In one embodiment, motor vehicle 102 may include electronic control unit 180, hereby referred to as ECU 180. In some cases, ECU 180 may be an onboard computer of some type configured to communicate with, and/or control, various components or systems of motor vehicle 102.

ECU 180 may include a number of ports that facilitate the input and output of information and power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with ECU 180 are optional. Some embodiments may include a given port or provision, while others may exclude it. The following description discloses many of the possible ports and provisions that can be used, however, it should be kept in mind that not every port or provision must be used or included in a given embodiment.

ECU 180 can include provisions for communicating with, and/or controlling valve 190. In some cases, ECU 180 can include valve port 182 configured to communicate with valve 190. In particular, ECU 180 may send signals to open and close valve 190 via valve port 182. In embodiments where valve 190 may be a servo type valve, ECU 180 may send signals that control the amount, pressure and direction of flow through valve 190.

In some embodiments, ECU 180 can also include provisions for transmitting and/or receiving information from one or more sensors. In particular, ECU 180 may include provisions for communicating with one or more sensors associated with an engine damping system. In one embodiment, ECU 180 can include first sensor port 183 configured to communicate with acceleration sensor 170. Using first sensor port 183, ECU 180 may be configured to receive accelerating information from acceleration sensor 170. In particular, ECU 180 can use the acceleration information to determine if engine 110 is generating unacceptable vibrations.

ECU 180 can also include second sensor port 184 configured to communicate with steering position sensor 148. With this arrangement, ECU 180 can be provided with steering position information from steering position sensor 148, respectively. In particular, ECU 180 can determine the steering mode of motor vehicle 102. For example, if steering position sensor 148 senses that steering wheel 160 is rotated, then ECU 180 can determine that motor vehicle 102 is in a turning steering mode. Likewise, if steering position sensor 148 senses that steering wheel 160 is in a default, non-rotated, position, then ECU 180 may determine that motor vehicle 102 is in a straight steering mode. In some cases, ECU 180 may determine that motor vehicle 102 is in a straight steering mode when the steering angle is within some predefined range or tolerance about a substantially straight position. Furthermore, in some cases, steering position sensor 148 can also sense the steering rotation rate. As long as the steering rotation rate is below a predetermined steering rotation rate limit, ECU 180 may determine that motor vehicle 102 is in the straight steering mode or low power steering mode. Likewise, if the steering rotation rate is above the predetermined steering rotation rate limit, ECU 180 may determine that motor vehicle 102 is in a turning steering mode or high power steering mode.

In some embodiments, ECU 180 can include provisions for communicating with one or more components of engine 110. In this embodiment, ECU 180 may include engine port 191 for communicating with one or more components of engine 110. In an exemplary embodiment, engine port 191 may be used to send and/or receive information from fuel injectors of engine 110. With this arrangement, ECU 180 may be configured to control individual fuel injectors of first cylinder 111, second cylinder 112, third cylinder 113, fourth cylinder 114, fifth cylinder 115 and sixth cylinder 116. In particular, ECU 180 can be configured to control the engine operating mode of engine 110.

In other embodiments, ECU 180 may include additional provisions for communication with other components of engine damping system 100 or components of motor vehicle 102. In another embodiment, for example, ECU 180 can include provisions for communicating directly with, and/or controlling, actuating device 130. In some cases, ECU 180 can include an actuating port configured to communicate with actuating device 130. In particular, the actuating port can be used to transmit signals for controlling actuating device 130.

Figure 3:
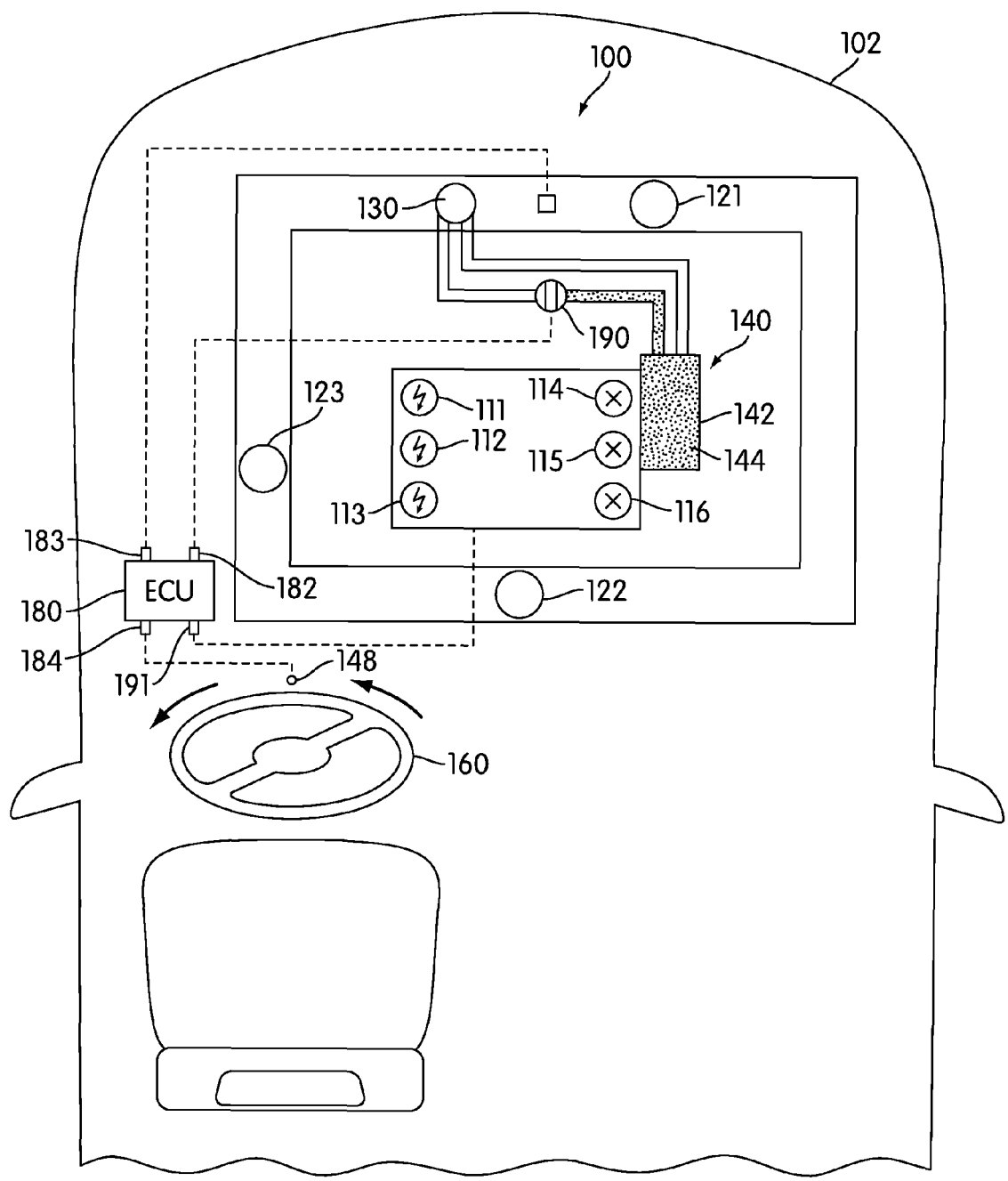
FIG. 3 is a schematic view of an exemplary embodiment of a portion of a motor vehicle including an engine damping system in a deactivated mode.

FIGS. 1-3 are intended to illustrate possible operating modes of engine damping system 100 according to conditions occurring within motor vehicle 102. Referring to FIG. 1, engine 110 is operating in a full cylinder mode. In other words, each cylinder of engine 110 is receiving fuel and producing power. During this full cylinder mode, vibrations caused by engine 110 may be minimal and actuating device 130 may be inactive. In this situation, some damping may occur at front engine mount 121, rear engine mount 122 and side engine mount 123.

As illustrated in FIG. 1, fluid communication between power steering system 140 and actuating device 130 is prevented during full cylinder mode. In particular, valve 190 may receive a control signal from ECU 180 to operate in a fully closed position. With valve 190 in a closed position, power steering fluid 144 does not flow through actuating device 130. Without access to the hydraulic power generated by power steering system 140, actuating device 130 is inactive.

FIG. 2 illustrates another operating mode of engine damping system 100. Referring to FIG. 2, engine 110 may be operating in a deactivated cylinder mode. In particular, engine 110 may be operating in a three cylinder, or L3, mode. In this case, fourth cylinder 114, fifth cylinder 115 and sixth cylinder 116 are all deactivated, while first cylinder 111, second cylinder 112 and third cylinder 113 remain activated. During this deactivated cylinder mode, increased vibrations from engine 110 may increase NVH in motor vehicle 102. In order to counteract these increased vibrations, engine damping system 100 may be activated. In particular, actuating device 130 may be operated to actively dampen the engine vibrations.

As illustrated in FIG. 2, fluid communication between power steering system 140 and actuating device 130 is permitted during deactivated cylinder mode. In particular, valve 190 may receive a control signal from ECU 180 to operate in an open position. With valve 190 in an open position, power steering fluid 144 flows through actuating device 130. With access to the hydraulic power generated by power steering system 140, actuating device may move in a manner that actively dampens the engine vibrations.

As previously discussed, valve 190 may be controlled by ECU 180 in a manner that controls the amount, pressure and direction of fluid flow. In other words, valve 190 can be operated in positions between a fully opened and a fully closed position. Furthermore, in order to generate different modes of vibration within actuating device 130, the position of valve 190 may be continuously changed to vary the flow of power steering fluid 144 through actuating device 130. In some cases, for example, valve 190 may be operated in a manner that rapidly increases and then decreases the flow of power steering fluid 144 through actuating device 130. In other cases, however, valve 190 could be set to a single open position through the duration of the engine damping.

In some cases, valve 190 may be controlled in different manners according to the engine operating mode. For example, a three cylinder mode and a four cylinder mode of a six cylinder engine may be associated with different vibration characteristics. In order to effectively reduce or cancel the vibrations generated by the three cylinder mode and the four cylinder mode, engine damping system 100 should be configured to generate different kinds of vibrations at actuating device 130. Therefore, ECU 180 can be provided with different control routines for operating valve 190 during different deactivated cylinder modes in order to generate different types of vibrations at actuating device 130.

An engine damping system can include provisions for providing feedback for controlling an actuating device. As previously discussed, ECU 180 may be configured to receive acceleration information directly from acceleration sensor 170. In particular, acceleration sensor 170 can be used to monitor the effectiveness of actuating device 130 in reducing the vibration forces generated during cylinder deactivation. In cases where actuating device 130 is not operating to substantially reduce vibrations generated by engine 110, acceleration sensor 170 may still detect undesirable levels of vibration. At this point, ECU 180 may modify the operation of actuating device 130 via the control of valve 190 in order to change the vibration characteristics of actuating device 130. In other words, ECU 180 may use acceleration information from acceleration sensor 170 to tune the damping characteristics of actuating device 130 in an attempt to substantially reduce NVH. Using this feedback control loop, engine damping system 100 can operate in a more efficient manner to reduce NVH. Furthermore, this feedback control loop allows engine damping system 100 to adjust to changing conditions of a motor vehicle that can generate varying types of vibrations. In contrast, systems not employing an acceleration sensor to provide feedback may be limited in controlling an actuating device to reduce vibrations.

It will be understood that some embodiments of the present invention could employ only the acceleration sensor in determining if an engine damping system should be activated. In particular, in another embodiment engine damping system 100 may be activated whenever undesirable levels of vibration or NVH are detected at acceleration sensor 170. In some cases, this would allow engine damping system 100 to operate actuating device 130 during a full cylinder mode as well as during deactivated cylinder modes. Since cylinder deactivation is only one of many possible sources of engine vibrations, engine damping system 100 could be adapted to dampen other types of engine vibrations as well through the use of acceleration sensor 170.

An engine damping system using a power steering system for a power source can include provisions for modifying damping when the power steering system is required to facilitate turning of a vehicle. In some cases, the engine damping system can be deactivated to allow all hydraulic power in the power steering system to be to assist with turning the vehicle. In other cases, the power required by the engine damping system can be reduced to limit the amount of hydraulic power being used when steering assistance is required from the power steering system. In an exemplary embodiment, an actuating device is shut off when a vehicle is turning in order to prevent interference with the power steering system.

Referring to FIG. 3, steering wheel 160 is turned to the left. In this situation, power steering system 140 may be used to assist with turning motor vehicle 102. To ensure that the hydraulic power provided by power steering system 140 is sufficient to facilitate turning motor vehicle 102, engine damping system 100 may be deactivated. In other words, actuating device 130 may be stopped even though the engine continues to operate in a deactivated cylinder mode and thus active damping is still desirable.

As seen in FIG. 3, valve 190 is closed according to control signals received from ECU 180. With valve 190 closed, fluid communication is prevented between power steering system 140 and actuating device 130. In particular, power steering fluid 144 is not available to power actuating device 130, which renders actuating device 130 inactive.

As steering wheel 160 is rotated back to a substantially straight position, or the steering rotation rate has been reduced below a predetermined limit, which is illustrated in FIG. 2, active damping may resume. In particular, valve 190 may be reopened by ECU 180 in order to reactivate actuating device 130 by restoring fluid communication with power steering system 140. With this arrangement, active damping of engine 110 may be momentarily stopped during turning of the vehicle, and can be resumed substantially immediately once the vehicle in moving in a straight line manner.

Figure 4:
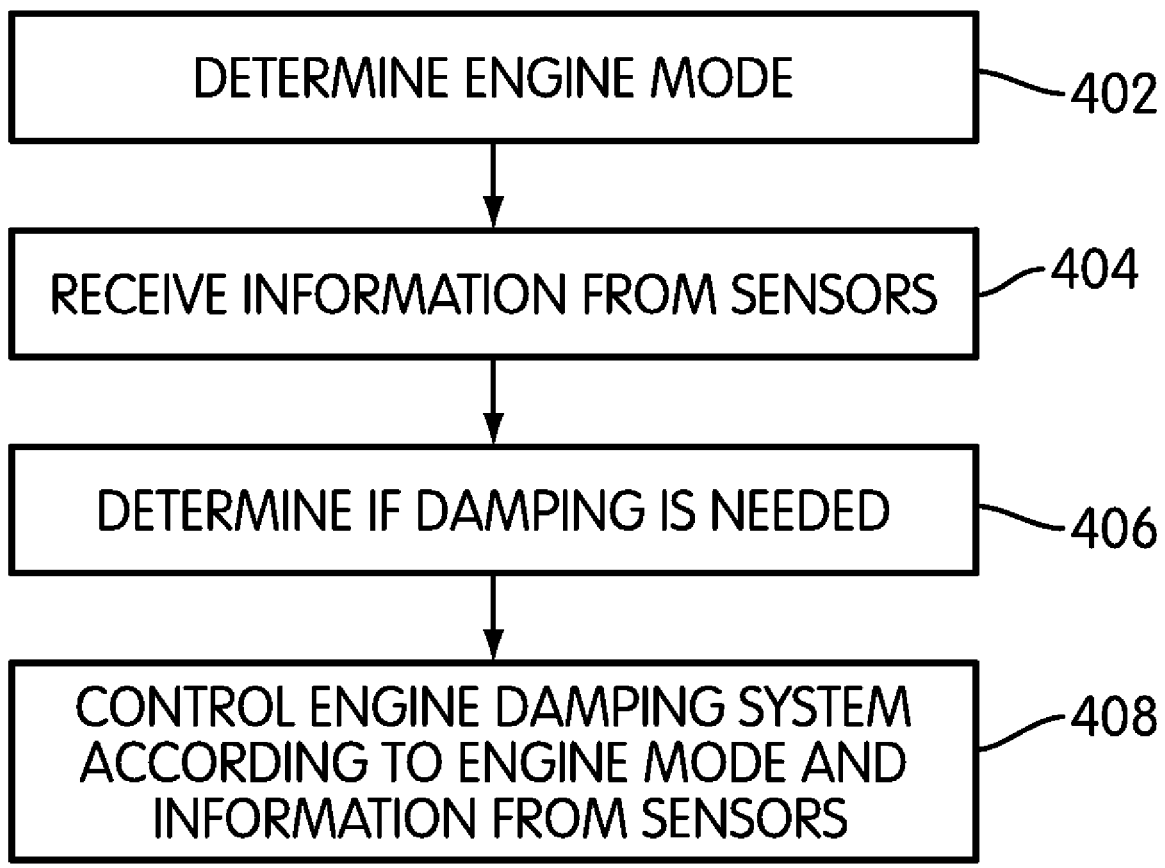
FIG. 4 is an exemplary embodiment of a process for controlling an engine damping system.

FIG. 4 illustrates an embodiment of a process for operating engine damping system 100. In some cases, the following steps may be performed by the ECU. However, in other cases, some or all of these steps may be performed by another system or component of the motor vehicle. Furthermore, it should be understood that some of the following steps may be optional in some embodiments.

Referring to FIG. 4, during a first step 402 of the process, an ECU may begin by determining a current engine mode of an engine. In other words, the ECU may determine if the engine is operating in a full cylinder mode or a deactivated cylinder mode. Typically, this information may already be stored within the ECU, as the ECU typically controls the variable cylinder management system for the engine. In other cases, however, a sensor may be associated with the engine to determine the current engine mode. In still other cases, other information about one or more engine systems can be used to infer the engine mode. For example, by knowing which fuel injectors are actively providing fuel to a corresponding cylinder, an ECU can determine if cylinder deactivation is occurring.

Next, during a second step 404, the ECU may receive information from one or more sensors. In different embodiments, different sensors may be employed. As previously discussed, some sensors that could be used include, but are not limited to: acceleration sensors, steering position sensors as well as other types of sensors.

During a third step 406, the ECU can determine if damping is needed. In some cases, the ECU can make this determination according to the current engine mode. For example, if the engine mode is a deactivated cylinder mode, the ECU can determine that damping is needed to counteract NVH generated by the deactivated cylinder mode. In other cases, however, the ECU can make a determination about damping according to information received from an acceleration sensor. Likewise, the ECU can determine if damping is needed according to information from the steering position sensor. For example, if the steering position sensor indicates that the vehicle is turning, the engine may determine that damping is not needed or is not possible.

Finally, during a fourth step 408, the ECU can control the engine damping system according to the current engine mode as well as other information received from the one or more sensors. For example, the engine may activate, or turn on, damping if the current cylinder mode is a deactivated cylinder mode. In addition, the ECU may use information from the acceleration sensor to determine how much damping is required. In other words, the ECU can use the acceleration information to provide feedback control for the engine damping system.

Figure 5:
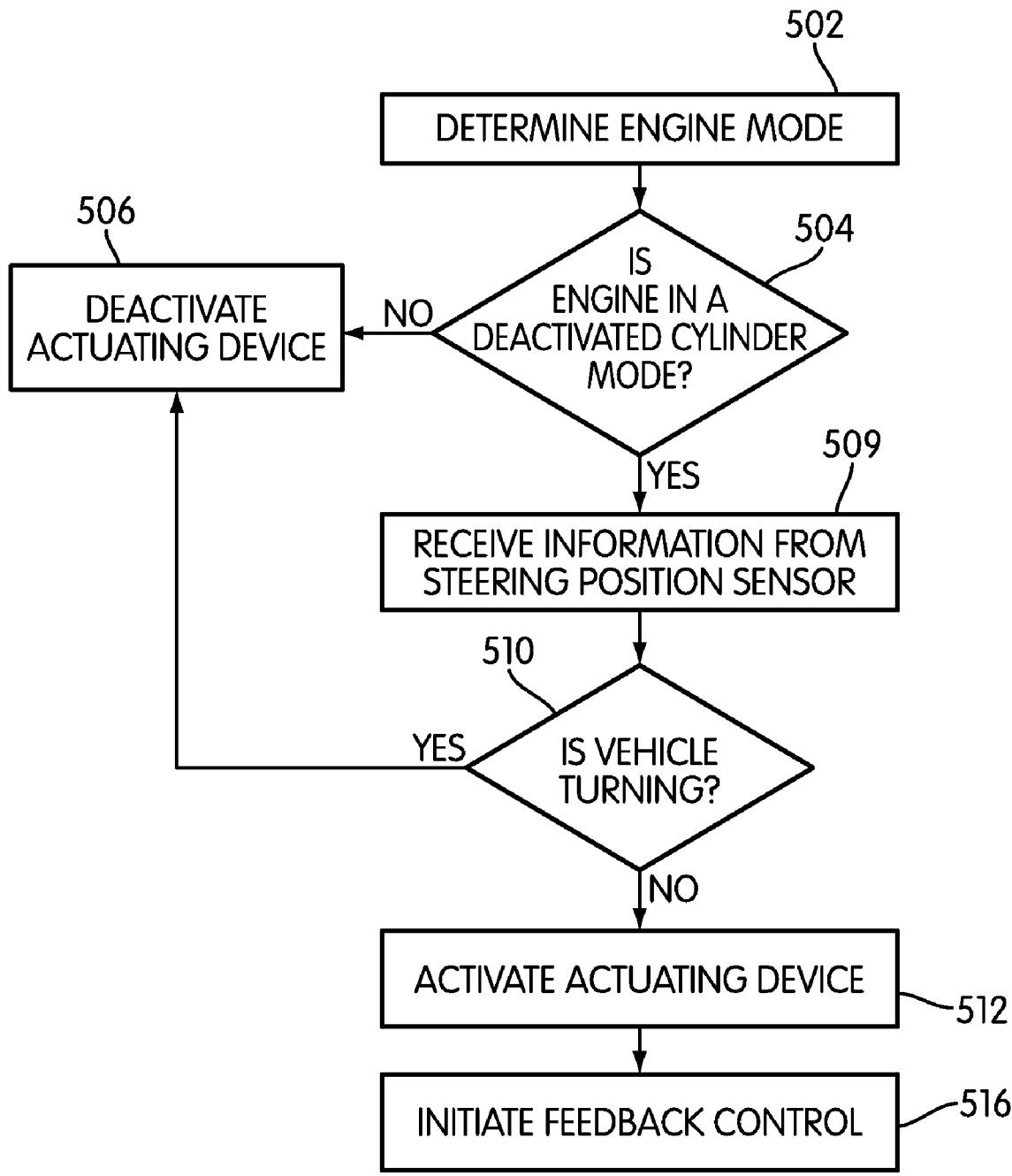
FIG. 5 is an exemplary embodiment of a detailed process for controlling an engine damping system.
Figure 6:
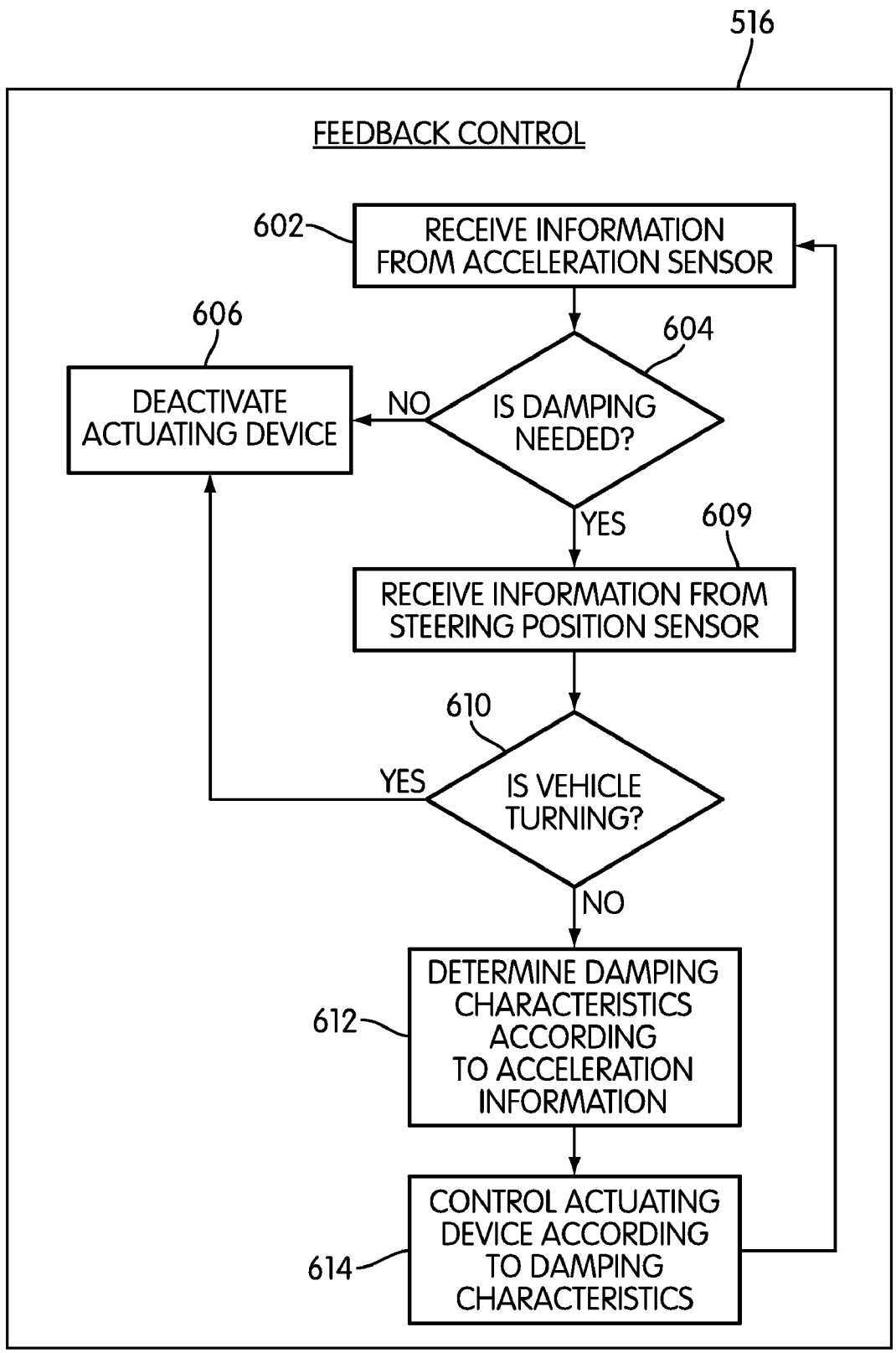
FIG. 6 is an exemplary embodiment of a detailed process for controlling an engine damping system.

FIGS. 5 and 6 illustrate detailed processes for controlling an engine damping system. In some cases, the following steps may be performed by the ECU. However, in other cases, some or all of these steps may be performed by another system or component of the motor vehicle. Furthermore, it should be understood that some of the following steps may be optional in some embodiments.

Referring to FIG. 5, during a step 502 of the process, the ECU may determine a current engine mode. Next, during a step 504, the ECU can determine if the engine is operating in a deactivated cylinder mode. If, during step 504, the ECU determines that the engine is not operating in a deactivated cylinder mode, the ECU may proceed to step 506. Because the engine is not operating in a deactivated cylinder mode, it must be operating in a full cylinder mode, which does not require active damping by the engine damping system. Therefore, during step 506, the ECU may prevent fluid communication between the power steering system and the actuating device by closing a valve in a manner previously discussed. At this point, the actuating device is deactivated and prevented from actively damping the engine.

If, during step 504, the ECU determined that the engine is operating in a deactivated cylinder mode, the ECU may proceed to step 509. During step 509, the ECU may receive information from a steering position sensor. At this point, the ECU can proceed to step 510. During step 510, the ECU may determine if the vehicle is turning according to information received from the steering position sensor.

If, during step 510, the ECU determines that the vehicle is turning, the ECU may proceed to step 506 in order to prevent the engine damping system from operating. If, on the other hand, the ECU determines during step 510 that the vehicle is not turning, the ECU can proceed to step 512 to initiate activation of the engine damping system.

During step 512, the ECU can permit fluid communication between the steering power system and the actuating device by opening a valve as previously discussed. At this point, the actuating device is activated and begins actively damping the engine. In some cases, the ECU may control the valve according to a predetermined control routine for actively damping the engine. In other cases, however, the ECU may proceed to an optional step during which feedback control is performed according to information received from the acceleration sensor.

In some cases, the ECU can proceed to step 516. It will be understood that step 516 is an optional step that may be performed by the ECU to provide feedback control for the engine damping system.

FIG. 6 illustrates a detailed process of feedback control which may be associated with the optional step 516. Referring to FIG. 6, during a step 602, the ECU can receive information from an acceleration sensor. At this point, the ECU can proceed to step 604 to determine if damping is needed. If, during step 604, the ECU determines that damping is not needed the ECU can proceed to step 606. During step 606, the ECU can prevent fluid communication between the power steering system and the actuating device by closing the valve. At this point, the actuating device is deactivated and no engine damping occurs.

If, during step 604 the ECU determines that damping is needed, the ECU can proceed to step 609. During step 609, the ECU may receive information from a steering position sensor. At this point, the ECU can proceed to step 610. During step 610, the ECU may determine if the vehicle is turning according to information received from the steering position sensor.

If, during step 610, the ECU determines that the vehicle is turning, the ECU may proceed to step 606 in order to prevent the engine damping system from operating. If, on the other hand, the ECU determines during step 610 that the vehicle is not turning, the ECU can proceed to step 612.

During step 612, the ECU may determine a set of damping characteristics according to information received from the acceleration sensor. These damping characteristics can be used to control the engine damping system in a manner that effectively reduces engine vibrations.

Next, during step 614, the ECU can control the valve according to the damping characteristics determined during step 612. By controlling the valve, the hydraulic pressure supplied to the actuating device by the power steering system can be modified to produce the desired damping characteristics for the actuating device.

At this point, the ECU can return to step 602 in order to receive more acceleration information from the acceleration sensor. The process described here therefore provides a controlled feedback loop for the operating of the engine damping system. In particular, engine damping may be provided by the actuating device until vibrations have been lowered to a point where damping is no longer needed, or during turning of the motor vehicle to prevent interference with the power steering system.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

I claim:

1. An engine damping system for a motor vehicle, comprising:
    an actuating device mounted to a sub-frame and disposed adjacent to an engine mount and configured to dampen vibrations between the engine and the sub-frame that are produced by the engine;
    a power steering system;
    at least one fluid line connecting the actuating device to the power steering system;
    a valve associated with the at least one fluid line configured to control the fluid communication between the power steering system and the actuating device;
    a control unit in communication with the valve; and
    wherein the engine damping system further includes a steering position sensor in communication with the control unit and wherein the control unit controls the valve according to information received from the steering position sensor.

2. The engine damping system according to claim 1, wherein the engine damping system further includes an acceleration sensor that is configured to measure vibrations of the engine, the acceleration sensor being in communication with the control unit.

3. The engine damping device according to claim 2, wherein the acceleration sensor is disposed adjacent to a front engine mount.

4. The engine damping device according to claim 2, wherein the control unit adjusts control of the valve according to information received from the acceleration sensor.

5. The engine damping device according claim 4, wherein the valve is a servo type valve.

6. A method of operating a motor vehicle, comprising the steps of:
    receiving information from a steering position sensor;
    controlling fluid communication between a power steering system and an actuating device according to an amount of hydraulic power required by the power steering system, as indicated by the information from the steering position sensor;
    wherein the actuating device is mounted to a sub-frame of the motor vehicle and is configured to dampen vibrations between an engine and the sub-frame.

7. The method according to claim 6, wherein the step of permitting fluid communication between the power steering system and the actuating device includes a step of controlling a valve.

8. The method according to claim 6, further comprising a step of receiving acceleration information from an acceleration sensor, the acceleration sensor being configured to monitor vibrations from an engine.

9. The method according to claim 8, further comprising a step of determining a damping characteristic according to the acceleration information and a step of controlling fluid communication between a power steering system and an actuating device according to the damping characteristic.

10. The method according to claim 6, wherein fluid communication between the power steering system and the actuating device is permitted when a straight mode or low power steering mode of the motor vehicle is detected by the steering position sensor.

11. The method according to claim 6, wherein the step of receiving acceleration information is preceded by a step of determining an engine mode of an engine.

12. The method according to claim 6, wherein the step of controlling fluid communication between the power steering system and the actuating device reduces hydraulic power to the actuating device when the steering position sensor indicates that the power steering system is used to provide steering assistance during turning of the motor vehicle.

13. The method according to claim 6, wherein fluid communication between the power steering system and the actuating device is prevented when a turning mode of the motor vehicle is detected by the steering position sensor.

14. The method according to claim 11, wherein the step of determining the engine mode of the engine includes a step of controlling fluid communication between the power steering system and the actuating device according to the engine mode.

15. A method of operating a motor vehicle, comprising the steps of:
    determining an engine mode of an engine;
    permitting fluid communication between an actuating device and a power steering system when the engine mode is a deactivated cylinder mode, wherein the actuating device is mounted to a sub-frame of the motor vehicle and is configured to dampen vibrations between the engine and the sub-frame; and
    preventing fluid communication between the actuating device and the power steering system when the engine mode is a full cylinder mode.

16. The method according to claim 15, wherein the step of determining the engine mode is followed by a step of receiving acceleration information from an acceleration sensor, the acceleration sensor being configured to monitor vibrations of the engine.

17. The method according to claim 16, wherein the acceleration information is used to control the fluid communication between the actuating device and the power steering system when the engine mode is the deactivated cylinder mode.

18. The method according to claim 16, wherein the step of receiving acceleration information is followed by a step of receiving information from a steering position sensor.

19. The method according to claim 18, wherein fluid communication between the actuating device and the power steering system is prevented when a turning mode of the motor vehicle is detected from the steering position sensor.

20. The method according to claim 18, wherein fluid communication between the actuating device and the power steering system is permitted when the steering position sensor detects that the motor vehicle is driving straight.

21. The method according to claim 15, wherein the fluid communication between the power steering system and the actuating device is controlled using a valve.

* * * * *